J. B. CLERMONT.
MEANS FOR SUSPENDING COUNTERBALANCE WEIGHTS.
APPLICATION FILED AUG. 15, 1914.

1,150,173.

Patented Aug. 17, 1915.

WITNESSES
George Du Bois
W. H. Lockwood

INVENTOR
John B. Clermont
BY
Briesen & Knauth
ATTORNEYS

UNITED STATES PATENT OFFICE.

JOHN B. CLERMONT, OF NEW YORK, N. Y., ASSIGNOR TO S AND S WINDOW CORPORATION, OF NEW YORK, N. Y., A CORPORATION OF NEW YORK.

MEANS FOR SUSPENDING COUNTERBALANCE-WEIGHTS.

1,150,173.  Specification of Letters Patent.  Patented Aug. 17, 1915.

Application filed August 15, 1914. Serial No. 856,925.

*To all whom it may concern:*

Be it known that I, JOHN B. CLERMONT, a citizen of the United States, and a resident of the borough and county of the Bronx, city and State of New York, have invented a certain new and useful Improvement in Means for Suspending Counterbalance-Weights, of which the following is a specification.

My invention relates to means for suspending sash or other counterbalance weights in windows and the like and has for its object to provide a simple and inexpensive means for suspending either single or twin counterbalance weights on single or double chains, cords and the like in a reliable and efficient manner and so as to be easily attached and detached.

My improvement will be fully described hereinafter and the features of novelty will be pointed out in the appended claims.

Reference is to be had to the accompanying drawings illustrating example of my improvement and in which—

Figure 1:
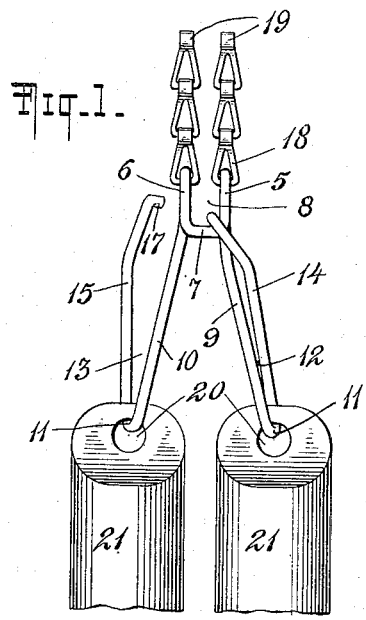
Figure 2:
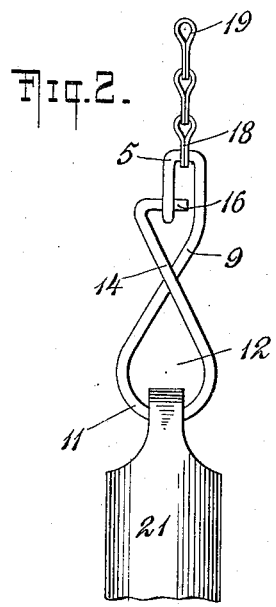
Figure 3:
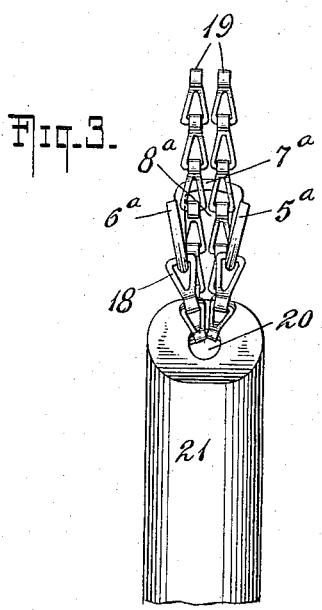
Figure 4:
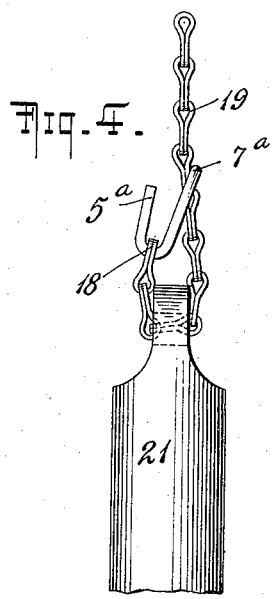

Figure 1 is a front view of one form of my invention; Fig. 2 is a side view thereof; Fig. 3 is a front view of another form of my improved means and Fig. 4 is a side view thereof.

As shown in Figs. 1 and 2 my improved means comprises parallel hooks 5 and 6 connected by a cross member 7 to form a loop 8, said hooks forming continuations of side members 9 and 10. The latter are bent at 11 to form loops 12 and 13 and are provided with upwardly continuing members 14 and 15 terminating in substantially horizontal free end portions 16 and 17.

The form of my invention so far described is preferably constructed from a continuous length of spring steel or other resilient wire bent or otherwise worked into the desired shape. The hooks 5 and 6 are arranged to extend through eyelets, or loops formed at one end of sash cords or the like and in the illustrated example project through the end links 18 of chains 19, one link 18 being attached to each hook 5 and 6. The bends 11 are adapted to be located in the usual apertures 20 of counterbalance weights 21 in the operative condition of the parts as clearly shown in Fig. 1. In connecting the form of my invention shown in Figs. 1 and 2 with the chains 19 and weights 21 the links 18 are first slipped over the free end portions 16 and 17 positioned approximately as shown at 17 in Fig. 1 and then moved lengthwise of the members 14 and 15. The said movement of said links 18 is continued along the bends 11 and lengthwise of the side members 9 and 10 until said links finally reach the bend of the hooks 5 and 6 as clearly shown in the drawings. The ends 16 and 17 and members 14 and 15 are now passed through the apertures 20 of each weight 21 until the bends 11 are reached after which the free end portions 16 and 17 are inserted into the loop 8 and are maintained therein by the resiliency of the material or more particularly the members 14 and 15. When completely connected in this manner and when viewed from the side as in Fig. 2, the members 14 and 15 cross the side members 9 and 10 and the portions 16 and 17 extend through the loop 8 completely across the space between the depending portions of the hooks 5 and 6 and the upper portions of the side members 9 and 10 so that the device has substantially the appearance of a figure eight as shown in said Fig. 2. The twin weights 21 are thus suspended in the closed loops 12 and 13 respectively, while the chains 19 are located in the hooks 5 and 6 the open ends of which are completely closed by the end portions 16 and 17 so that both the weights 21 and the chains 19 are connectced with the device in a manner to prevent accidental separation in case the chains should become slackened from any cause. To detach the weights and to disconnect the chains the members 14 and 15 are bent against their tension to remove the end portions 16 and 17 from the loop 8 whereupon they immediately assume approximately the position shown at 17 in Fig. 1 and thus permit the weights and chains to be easily removed by a reverse operation. While I have illustrated and described this form of my device in combination with double chains and twin weights it will be readily apparent that the same may be as readily used with a single chain and a single weight if desired. In this case the end of the single chain 18 would be looped over both hooks 5 and 6 while both members 14 and 15 and both ends 11 would extend through the aperture 20 of a single weight 21. Similarly the device may be combined with a single chain and twin weights or with double chains and a single weight if desired.

In any case my improvement absolutely assures automatic compensation on each chain separately or on two chains together and the center of gravity of the weight or weights is at all times substantially in line with the chain or in registry with a vertical line between a pair of chains. The weight of the mass is thus evenly distributed whether one or two weights or one or two chains are used at the same time a perfect and reliable connection between the chains and weights is secured which is readily detachable and attachable when desired.

In the form shown in Figs. 3 and 4 the device comprises a preferably continuous piece of wire or similar material bent or shaped to form parallel hooks 5$^a$ and 6$^a$ connected by a cross piece 7$^a$ as shown best in Fig. 3. In utilizing this form of my invention the chains 19 are passed through the space 8$^a$ between the hooks 5$^a$ and 6$^a$ and as shown extend through the opening 20 of a single weight 21 and have their end links 18 each engaged with one of the hooks 5$^a$ and 6$^a$ respectively. A slip loop is thus formed at the end of the chains in which the weight is efficiently suspended, it being understood, if it is desired to support twin weights with this form of my improvement, that each chain is passed singly through an opening 20 of the individual weights 21, as will be clearly apparent.

The form last described operates substantially in the same way as the form first described and includes the same advantages.

Both types of my device thus provide a simple and readily detachable and attachable means for suspending any kind of counterbalance or other weights from chains or the like in the most effective manner and have the additional advantage of being cheap to manufacture and produce without the necessity for using complicated mechanism.

Various changes in the specific forms shown and described may be made within the scope of the claims without departing from the spirit of my invention.

I claim:

1. The combination of a pair of flexible suspending elements, and a suspending device comprising a continuous length of wire or the like shaped to form a pair of parallel hooks, each of which is detachably connected with one end of each suspending element.

2. A device of the kind described comprising a pair of parallel hooks, a connection between said hooks forming a loop, resilient means connected with said hooks and adapted to extend into said loop to close the open ends of said hooks.

3. A device of the kind described comprising a pair of parallel hooks, a connection between said hooks forming a loop, members extending from said hooks in one direction, resilient members extending in the reverse direction and connected with said first members by bends and means on said resilient members adapted to extend into said loop to close the open ends of said hooks.

4. A device of the kind described comprising a pair of parallel hooks, a connection between said hooks forming a loop, members extending from said hooks in one direction, resilient members extending in the reverse direction and crossing said first members, said resilient members being connected with said first members by bends, and substantially horizontal projections adapted to extend into said loop to close the open ends of said hooks.

5. A device of the kind described comprising a continuous length of wire shaped to form a pair of upwardly normally open members each detachably connected with a separate element and means whereby said members are transversely and rigidly secured together.

6. The combination of a counterbalance weight having an aperture, a suspending device comprising two parallel hooks, a connection extending transversely between said hooks to form a loop and a pair of flexible suspending elements passing through said loop and said aperture and having their ends each detachably connected with one of said hooks.

In testimony whereof I have hereunto set my hand in the presence of two subscribing witnesses.

JOHN B. CLERMONT.

Witnesses:
JOHN A. KEHLENBECK,
FRED A. KLEIN.

Copies of this patent may be obtained for five cents each, by addressing the "Commissioner of Patents, Washington, D. C."